Patented Mar. 13, 1945

2,371,436

UNITED STATES PATENT OFFICE 2,371,436

HEAT-PRODUCING COMPOSITIONS

Wilmer C. Gangloff and Stuart O. Fiedler, Cincinnati, Ohio, assignors to The Drackett Company, Cincinnati, Ohio, a corporation of Ohio No Drawing. Application November 20, 1942,
Serial No. 466,375

5 Claims. (Cl. 252—157)

This invention relates to new and improved compositions for the production of heat and is particularly concerned with the type of composition consisting of a mixture of dry ingredients which, when admixed with a water, are capable of reacting violently to liberate heat.

Mixtures of chemical agents for this purpose have long been in common use for supplying heat to so-called fireless cookers, for the cleaning of grease clogged drains, and for other purposes in which the generation of heat is required. A mixture frequently employed for this purpose includes as its essential ingredients aluminum and an alkaline agent such as sodium or potassium hydroxide, the addition of water to the mixture causing the aluminum and alkali to react violently, producing both heat and mechanical agitation.

The problem of obtaining an adequate supply of aluminum for use in such mixtures becomes increasingly difficult to solve, and aluminum alloys, aluminum drosses, and the like have been employed. However, in order that the reaction will produce the requisite heat, the percentage of aluminum required has remained substantial, regardless of the form in which it is introduced in the mixture.

The present invention is based on the discovery that the percentage of aluminum in such mixtures may be substantially reduced without corresponding reduction in the amount of heat evolved if sodium chlorite is added. To state the matter differently, it is found that increased heat can be produced by reaction between aluminum and an alkali if sodium chlorite is present. This is presumably due to the fact that side reactions occur when the chlorite is added, and while the exact nature of such reactions are not known, it is not improbable that they can be represented by the following formulae in the case of a mixture of aluminum and sodium hydroxide:

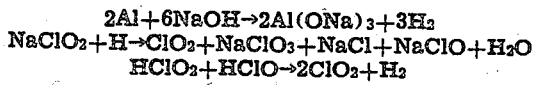

$ClO_2$ is easily produced on decomposition from chlorites. It is possible that the $ClO_2$ thus released reacts with hydrogen to form acids which in turn react on the caustic soda, liberating heat of neutralization, and that this adds to the heat of reaction engendered by the mix. However, the chemistry of sodium chlorite is still largely unknown and its outward behavior in mixtures of this type is difficult to predict. The following is a specific example of one mixture which has produced excellent results in the cleaning of drains.

3% of comminuted aluminum is admixed with 10% powdered or granular sodium chlorite and 87% caustic soda or potash in comminuted form, either ground or flakes, the ingredients being substantially dry when mixed. When 300 parts of this mixture are added to 1000 parts of water, immediate reaction occurs with the liberation of a substantial amount of heat and with considerable mechanical agitation, sufficient in most instances to clear clogged drains, sink traps, and the like.

In order to conserve aluminum, the latter may be replaced in the foregoing example by 5% of aluminum dross, containing 50% to 60% aluminum, or by an equivalent amount of an aluminum alloy, reference herein to the metal being intended to include impure forms thereof.

Other proportions of reactants can be used depending upon the temperatures desired, the speed of reaction required, and upon economic factors. For example, in the preparation of a composition for clearing drains, the aluminum may be varied from 2% to 6%, and the chlorite from 6% to 12%, based on the total weight of aluminum, chlorite, and alkali, and the mixture may be employed with from two to four times as much water by volume. We have found, however, that the percentage of chlorite employed is fairly critical and may not deviate substantially from the foregoing range, if the desired result is to be achieved, although it will be appreciated that in general these stated quantities may be varied much more widely in the use of the mixture for widely varying purposes.

Any alkaline agent, the term including any substance affording an alkaline reaction when admixed with water and capable of reacting with aluminum to produce heat, may be employed. We prefer to use an alkali metal or an alkaline earth metal hydroxide, especially sodium or potassium hydroxide.

It will also be understood that the mixture may include, in addition to the ingredients specified, such further ingredients as are ordinarily employed to further the desired action either as regards the production of heat or for other purposes incidental to the use in which the mixture is to be employed. For example, oxidizing agents, catalytic agents such as zinc, and inert ingredients acting merely as carriers may be comprised in the mixture to which our invention may be applied.

Having thus described the invention, what is claimed as new and desired to be secured by Letters Patent is:

1. A composition liberating heat when added to water, comprising, in admixture in substantially dry and divided form, about 2 to 6% of aluminum, a major proportion of an alkaline agent capable of reacting with aluminum to produce heat, and about 6% to 12% of sodium chlorite, based on the total weight of aluminum, chlorite and alkali.

2. A composition liberating heat on admixture with water and consisting essentially of 3% comminuted aluminum, 10% finely divided sodium chlorite, and 87% comminuted caustic soda, based on the total weight of aluminum, chlorite and alkali.

3. A method of clearing grease clogged drains and the like, which comprises introducing in the drain a heat liberating composition and water in the ratio of about 3 to 10, said composition consisting essentially of 3% comminuted aluminum, 10% finely divided sodium chlorite, and 87% comminuted caustic soda, based on the total weight of aluminum, chlorite and alkali.

4. A composition liberating heat when added to water, consisting essentially of a substantially dry comminuted mixture of 3% to 6% aluminum, 6% to 12% sodium chlorite, and a major proportion of an alkaline agent capable of reacting with aluminum to produce heat, based on the total weight of aluminum, chlorite and alkali.

5. A composition liberating heat when added to water, comprising a substantially dry comminuted mixture of 3% to 6% aluminum, 6% to 12% finely divided sodium chlorite, and a major proportion of caustic soda, based on the total weight of aluminum, chlorite and alkali.

WILMER C. GANGLOFF.
STUART O. FIEDLER.